(12) United States Patent
Stewart et al.

(10) Patent No.: US 7,451,543 B2
(45) Date of Patent: Nov. 18, 2008

(54) METHODS OF SECURING A BEARING WITH AN ADAPTOR SLEEVE WITHIN AN OPENING OF A HOUSING

(75) Inventors: William P. Stewart, Saint Peters, MO (US); Charles P. Ketterer, Weybridge (GB); Donald J. Williams, Pierron, IL (US)

(73) Assignee: Emerson Electric Co., St. Louis, MO (US)

( * ) Notice: Subject to any disclaimer, the term of this patent is extended or adjusted under 35 U.S.C. 154(b) by 523 days.

(21) Appl. No.: 10/958,199

(22) Filed: Oct. 4, 2004

(65) Prior Publication Data

US 2006/0073042 A1   Apr. 6, 2006

(51) Int. Cl.
  *B21D 53/10* (2006.01)
  *B23P 11/02* (2006.01)
(52) U.S. Cl. .................. 29/898.07; 29/432.1; 29/432.2; 29/446; 29/447
(58) Field of Classification Search ............. 29/898.07, 29/898.09, 898.044, 898.043, 898.054, 592, 29/428, 432.1, 432.2, 446, 447
See application file for complete search history.

(56) References Cited

U.S. PATENT DOCUMENTS

| 529,437 | A |  | 11/1894 | Wood |  |
|---|---|---|---|---|---|
| 2,072,769 | A |  | 3/1937 | Reeder |  |
| 2,479,330 | A |  | 8/1949 | Fagley |  |
| 3,050,832 | A |  | 8/1962 | Scheldorf |  |
| 3,492,517 | A |  | 1/1970 | Kuraisi |  |
| 3,845,334 | A | * | 10/1974 | Harada et al. | 310/46 |
| 3,946,260 | A | * | 3/1976 | Frezzolini et al. | 310/112 |
| 3,990,141 | A |  | 11/1976 | Stark |  |
| 4,253,031 | A |  | 2/1981 | Frister |  |
| 4,603,273 | A |  | 7/1986 | McDonald |  |
| 4,617,726 | A |  | 10/1986 | Denk |  |
| 4,758,755 | A |  | 7/1988 | Sherman et al. |  |
| 4,801,831 | A |  | 1/1989 | Lewis |  |

(Continued)

FOREIGN PATENT DOCUMENTS

DE   19935723   10/2000

(Continued)

OTHER PUBLICATIONS

Online Dictionary Definition for "Impeller".*

(Continued)

*Primary Examiner*—David P Bryant
*Assistant Examiner*—Sarang Afzali
(74) *Attorney, Agent, or Firm*—Harness, Dickey & Pierce, P.L.C.

(57) ABSTRACT

A rotor assembly for an electric machine includes a rotatable shaft, a rotor core coupled to the shaft for common rotation, and an impeller coupled to the shaft for common rotation. A bearing is coupled to the shaft generally between the rotor core and the impeller. The bearing can include an outer race sized smaller than an opening defined by the machine housing. The bearing can include steel rolling elements such as steel balls or generally cylindrical steel rollers. An adaptor sleeve can be disposed generally around the outer race. The adaptor sleeve can be disposed within the opening defined by the housing for securing the adaptor sleeve and the bearing within the opening defined by the housing.

11 Claims, 5 Drawing Sheets

U.S. PATENT DOCUMENTS

| | | | |
|---|---|---|---|
| 4,850,193 | A | 7/1989 | Kawamura |
| 4,888,510 | A | 12/1989 | Hunt |
| 4,908,922 | A * | 3/1990 | Abe .................. 29/898.062 |
| 4,982,125 | A | 1/1991 | Shirakawa |
| 5,006,744 | A | 4/1991 | Archer et al. |
| 5,059,042 | A | 10/1991 | Grierson |
| 5,128,576 | A | 7/1992 | Obradovic |
| 5,199,171 | A | 4/1993 | Umezawa et al. |
| 5,638,796 | A | 6/1997 | Adams, III et al. |
| 5,926,663 | A | 7/1999 | Suzuki |
| 5,973,428 | A | 10/1999 | Zakrocki et al. |
| 6,065,760 | A | 5/2000 | Weygandt |
| 6,145,314 | A | 11/2000 | Woollenweber et al. |
| 6,173,996 | B1 | 1/2001 | Derakhshan et al. |
| 6,212,753 | B1 | 4/2001 | Derakhshan et al. |
| 6,271,609 | B1 | 8/2001 | Hollenbeck et al. |
| 6,400,059 | B1 | 6/2002 | Hsu |
| 6,404,095 | B1 | 6/2002 | Hsu |
| 6,448,686 | B1 | 9/2002 | Dawson et al. |
| 6,487,769 | B2 | 12/2002 | Ketterer et al. |
| 6,515,397 | B1 | 2/2003 | Schmid |
| 6,572,283 | B1 | 6/2003 | Imano |
| 6,583,530 | B2 | 6/2003 | Hsu |
| 6,651,633 | B1 | 11/2003 | Jones |
| 6,713,916 | B1 | 3/2004 | Williams et al. |
| 6,848,165 | B1 | 2/2005 | Furuse |
| 6,941,644 | B2 | 9/2005 | Shteynberg et al. |
| D515,521 | S | 2/2006 | Stewart et al. |
| 7,036,206 | B2 | 5/2006 | Worden et al. |
| 2002/0011755 | A1 | 1/2002 | Shteynberg et al. |
| 2003/0067243 | A1 | 4/2003 | Hollenbeck et al. |
| 2004/0183388 | A1 | 9/2004 | Rittmeyer |
| 2006/0070229 | A1 | 4/2006 | Stewart et al. |
| 2006/0071564 | A1 | 4/2006 | Stewart |
| 2006/0071569 | A1 | 4/2006 | Stewart et al. |
| 2006/0071574 | A1 | 4/2006 | Stewart |
| 2006/0072288 | A1 | 4/2006 | Stewart et al. |

FOREIGN PATENT DOCUMENTS

| | | |
|---|---|---|
| EP | 1 367 699 A2 | 12/2003 |
| WO | WP 99/33158 | 7/1999 |
| WO | WO 03/021746 A1 | 3/2003 |
| WO | WO 03/096515 A1 | 11/2003 |
| WO | WO 2004/004098 A1 | 1/2004 |
| WO | WO 2005/085611 A1 | 9/2005 |

OTHER PUBLICATIONS

Pending U.S. Appl. No. 10/958,198 for Electric Machines and Methods Related to Assembling Elect, Oct. 4, 2004, Stewart et al.

Pending U.S. Appl. No. 10/958,213 for Electric Machines and Methods Related to Assembling Electric Machines, Oct. 4, 2004, Stewart et al.

Design of a High Speed Switched Reluctance Machine for Automotive Turbo-Generator Applications; S.D. Calverly, et al; University of Sheffield; SAE Technical Paper Series 1999-01-2933; Aug. 17-19, 1999, pp. 1-10.

Visteon Partners in Technology; European Automotive Design; Oct. 2002; pp. 30-43.

Aerodynamic Losses in Switched Reluctance Machines; S.D. Calverley, et al; IEE Proc.-Electr. Power Appl., vol. 147, No. 6, Nov. 2000; pp. 443-448.

* cited by examiner

METHODS OF SECURING A BEARING WITH AN ADAPTOR SLEEVE WITHIN AN OPENING OF A HOUSING

FIELD

The present invention generally relates to electric machines, and more particularly (but not exclusively) to bearing systems for electric machines that operate at high speeds and/or elevated temperatures, such as electric superchargers.

BACKGROUND

Electric machines that operate at high speeds and/or elevated temperatures typically require specialized bearing systems for low friction long life operation. Examples of specialized bearing systems include air bearings, hydrodynamic bearings, magnetic bearings, and bearings with balls formed of exotic hybrid ceramic materials. But these specialized bearing systems can increase the number of component parts and assembly steps as well as the time and costs associated with machine manufacture and assembly.

SUMMARY

In one implementation, the present invention provides a rotor assembly for an electric machine. The rotor assembly includes a rotatable shaft, a rotor core coupled to the shaft for common rotation, and an impeller coupled to the shaft for common rotation. A bearing is coupled to the shaft generally between the rotor core and the impeller. The bearing includes an outer race sized smaller than an opening defined by the machine housing. The bearing can include steel rolling elements such as steel balls or generally cylindrical steel rollers. An adaptor sleeve is disposed generally around the outer race. The adaptor sleeve is disposed within the opening defined by the housing for securing the adaptor sleeve and the bearing within the opening defined by the housing.

In another aspect, the present invention provides an electric machine that includes a housing defining an opening and a rotor assembly. In one implementation, the rotor assembly includes at least one bearing and an adaptor sleeve. The bearing has an outer race sized smaller than the opening defined by the housing. The bearing can include steel rolling elements such as steel balls or generally cylindrical steel rollers. The adaptor sleeve is disposed generally around the outer race. The adaptor sleeve is disposed within the opening and forms an interference fit with the housing. The interference fit secures the adaptor sleeve and the bearing within the opening defined by the housing independent of mechanical fasteners.

According to another aspect, the present invention provides an electric supercharger that includes a rotatable shaft and a rotor core coupled to the shaft for common rotation. At least one bearing is rotatably coupled to the shaft. The bearing includes steel rolling elements such as steel balls or generally cylindrical steel rollers.

In yet another aspect, the present invention provides methods of securing a bearing within an opening defined by a housing of an electric machine when the opening is larger than an outer race of the bearing. In one implementation, the method generally includes positioning an adaptor sleeve generally around the outer race, and forming an interference fit between the housing and the adaptor sleeve. The interference fit secures the adaptor sleeve and the bearing within the opening defined by the housing.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

Corresponding reference numerals indicate corresponding parts throughout the several views of the drawings.

DETAILED DESCRIPTION OF THE EXEMPLARY EMBODIMENTS

The following description of the exemplary embodiments is merely exemplary in nature and is in no way intended to limit the invention, its application, or uses.

According to one aspect, the present invention provides rotor assemblies for electric machines. In one implementation, the rotor assembly includes a rotatable shaft, a rotor core coupled to the shaft for common rotation, and an impeller coupled to the shaft for common rotation. A bearing is coupled to the shaft generally between the rotor core and the impeller. The bearing includes an outer race sized smaller than an opening defined by the machine housing. The bearing can include steel rolling elements such as steel balls or generally cylindrical steel rollers. An adaptor sleeve is disposed generally around the outer race. The adaptor sleeve is disposed within the opening defined by the housing for securing the adaptor sleeve and the bearing within the opening defined by the housing.

With the adaptor sleeve, smaller bearings can be supported within a space or opening physically better suited for larger bearings. This can be beneficial because smaller bearings typically have higher limiting speeds than larger bearings. In addition, the adaptor sleeve can also allow bearings to be assembled into a machine housing without any (or at least reduced) pressure being exerted on the bearing, which might otherwise damage the bearings. In various implementations, the adaptor sleeve further allows a completely balanced rotor assembly to be installed into (e.g., by way of a drop through construction) a machine housing.

In other aspects, the invention provides bearing systems, adaptor sleeves, electric machines, electric motors, electric superchargers, vehicles (e.g., automobiles, etc.), switched reluctance motors, brushless permanent magnet (BPM)

motors, induction motors, and electric generators that include bearing systems and/or adaptor sleeves of the present invention. Further aspects of the invention include electric superchargers that include bearings having steel rolling elements (e.g., steel balls or generally cylindrical steel rollers).

Various implementations enable bearings having steel rolling elements (e.g., standard 8 mm steel ball bearings) to be used in electric machines that operate at high speeds and/or elevated temperatures despite the prevailing conventional wisdom insisting that hybrid ceramic angular contact bearings be used. By using bearings with steel rolling elements instead of the more expensive hybrid ceramic angular contact bearings, various implementations can provide significant cost savings even while still satisfying the high performance requirements demanded by some electric machines, such as an electric supercharger capable of accelerating to seventy thousand revolutions per minute in three-tenths of a second.

Figure 1:
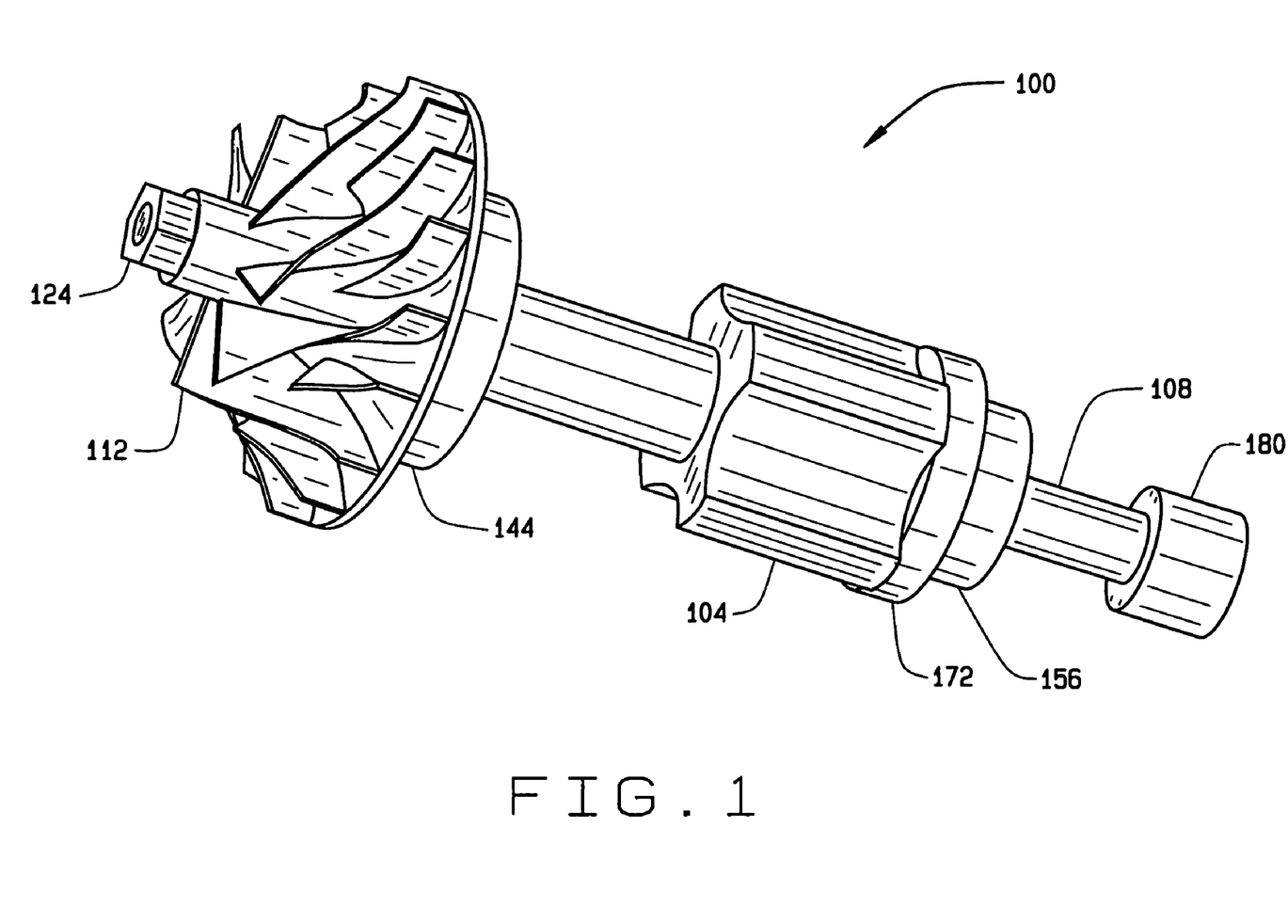
FIG. 1 is a perspective view of a rotor assembly according to an exemplary embodiment of the invention.
Figure 2:
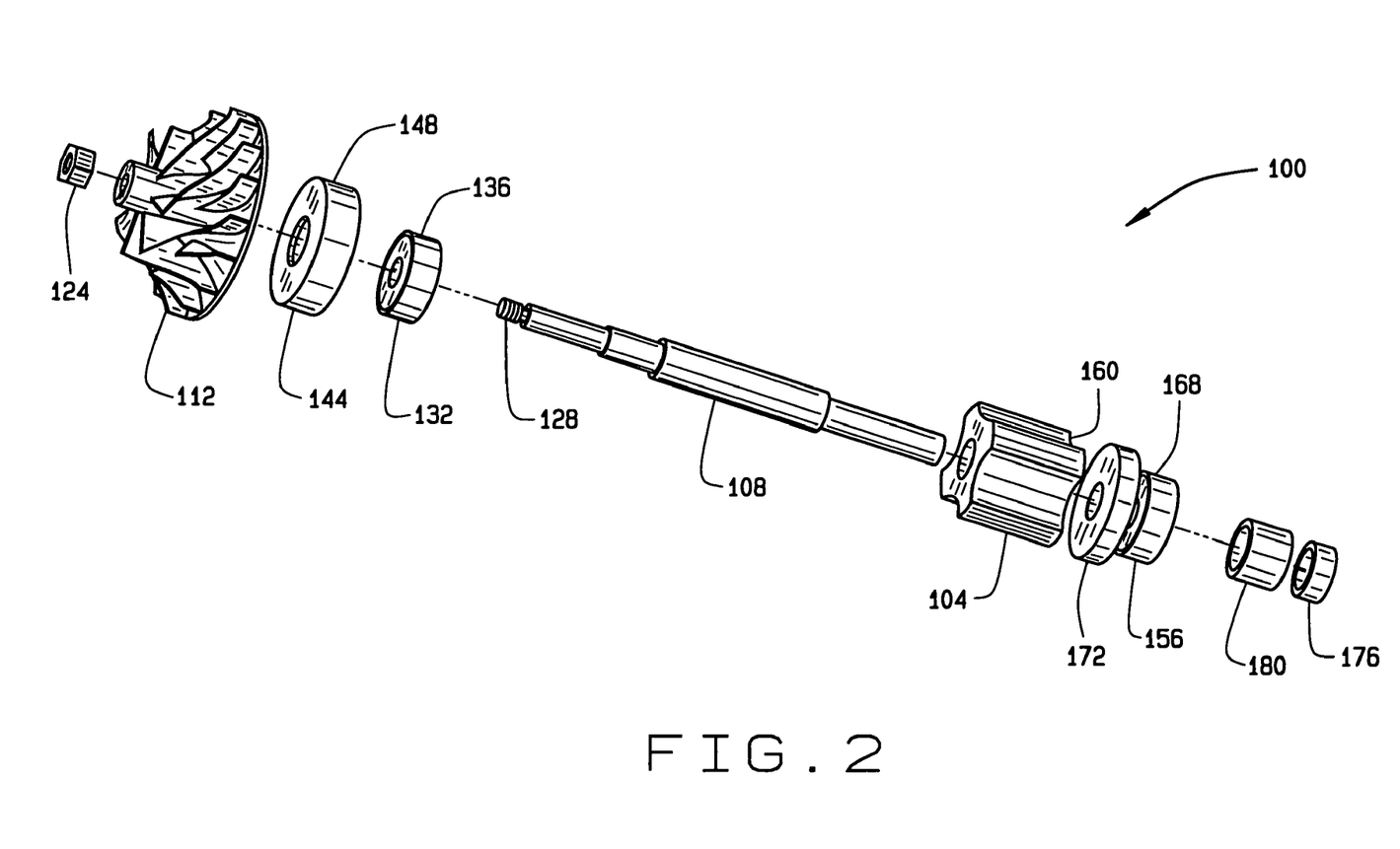
FIG. 2 is an exploded perspective view of the rotor assembly shown in FIG. 1.

Referring now to FIGS. 1 and 2, there is shown an exemplary rotor assembly 100 in accordance with the principles of this invention. As shown, the rotor assembly 100 includes a rotor core 104 coupled to a shaft 108 for common rotation. In one implementation, the rotor core 104 is a ten millimeter inner diameter core, although other sizes are possible depending on the particular application.

An impeller 112 is also coupled to the shaft 108 for common rotation. The impeller 112 can be sized to fit within a recessed portion 116 defined by the machine housing 120 (shown in FIGS. 5 and 6). During operation when the shaft 108 and impeller 112 are rotating, the impeller 112 creates a current of air external to the machine housing 120. This airflow created by the rotating impeller 112 helps to cool the machine housing 120 and components (e.g., rotor core 104, stator, end shield, etc.) therein by forced convection. In one implementation, the impeller 112 has an outer diameter between about sixty to seventy millimeters, although other sizes are possible depending on the particular application.

In the illustrated embodiment of FIG. 2, an impeller lock nut 124 is threaded onto an end 128 of the shaft 108 to maintain the impeller 112 on the shaft 108. Alternatively, other means can be employed for retaining the impeller 112 on the shaft 108.

With further reference to FIG. 2, a bearing 132 is coupled to the shaft 108 generally between the rotor core 104 and the impeller 112. In preferred implementations, the bearing 132 includes steel rolling elements. In one exemplary embodiment, the bearing 132 is a standard 608-size ball bearing having steel balls. In another embodiment, however, the bearing 132 is a roller bearing having generally cylindrical steel rollers. In either case, using steel rolling elements instead of hybrid ceramic angular contact bearings can provide significant cost savings.

The bearing's outer race 136 is dimensionally sized smaller than the opening 140 defined by the housing 120. To allow the bearing 132 to be mounted within the opening 140 even though it is physically better suited for larger bearings, an adaptor sleeve 144 is disposed generally around the bearing's outer race 136. Accordingly, the adaptor sleeve 144 allows smaller bearings to be supported within a space physically better suited for larger bearings. This can be beneficial because smaller bearings typically have higher limiting speeds than larger bearings.

Figure 4:
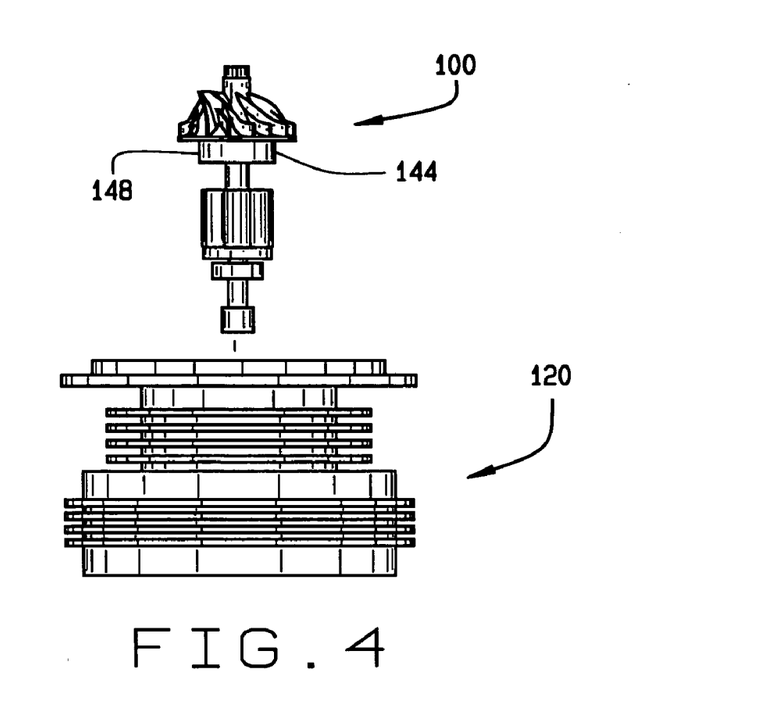
FIG. 4 is a perspective view of the rotor assembly shown in FIG. 1 aligned for engagement with a housing according to an exemplary implementation of the invention.
Figure 5:
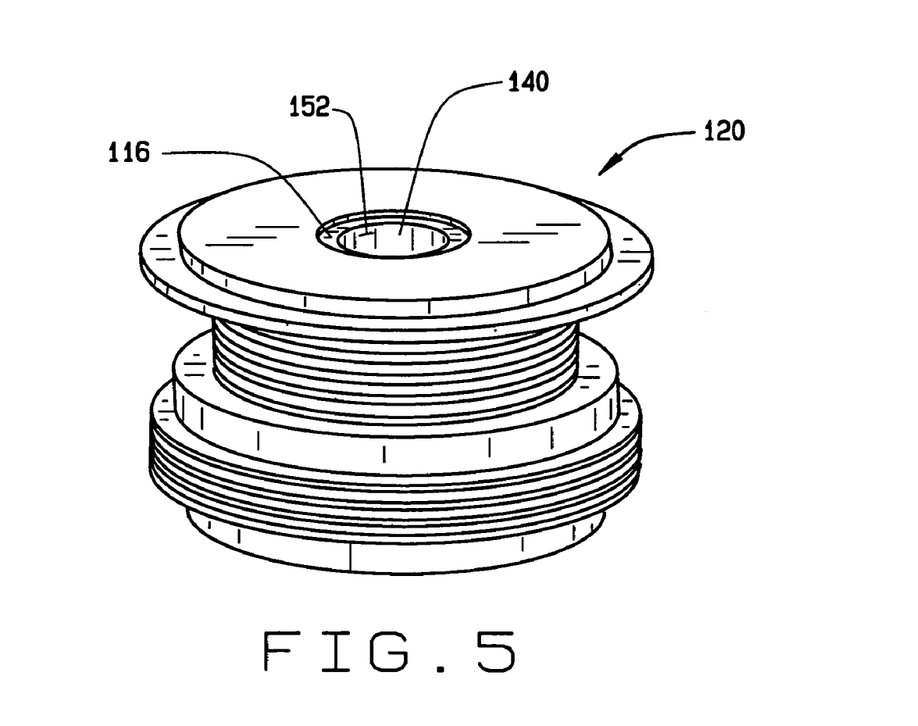
FIG. 5 is an upper perspective view of the housing show in FIG. 4.

The adaptor sleeve 144 is sized such that its sidewall 148 (FIG. 4) can form an interference fit with an inner surface 152 of the housing 120 (FIG. 5). This interference fit secures the adaptor sleeve 144 and the bearing 132 within the opening 140 defined by the housing 120.

A description will now be provided of an exemplary method for forming the interference fit between the adaptor sleeve's sidewall 148 and the housing's surface 152. First, the housing 120 can be heated (e.g., induction heated, etc.) to thermally expand the housing 120. The adaptor sleeve 144 and/or housing 120 can then be moved relative to one another so as to position the adaptor sleeve 144 within the opening 140 of the thermally expanded housing 120. That is, the adaptor sleeve 144 can be moved towards the housing 120 as the housing 120 remains stationary, or the housing 120 can be moved towards the adaptor sleeve 144 as the adaptor sleeve 144 remains stationary, or both the adaptor sleeve 144 and the housing 120 can be moved towards each other.

Figure 6:
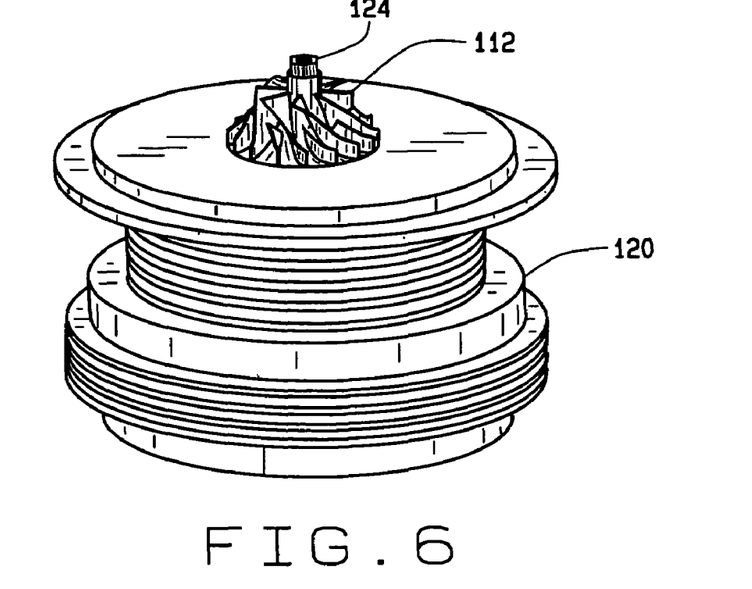
FIG. 6 is an upper perspective view of the housing and the impeller of the rotor assembly shown in FIG. 4 after the rotor assembly has been engaged with the housing.

In preferred implementations, the rotor assembly 100 can be fully assembled (as shown in FIGS. 3A through 3G) and balanced before it is installed into or coupled to the housing 120. In these implementations then, positioning the adaptor sleeve 144 within the housing's opening 140 can include relatively moving the entire rotor assembly 100 and the housing 120. For example, a completely balanced rotor assembly 100 can be moved relatively downward into the housing 120 as shown in FIGS. 4 through 6.

Eventually, the housing 120 is allowed to sufficiently cool and thermally contract against the adaptor sleeve's sidewall 148, thereby forming an interference fit between the housing 120 and the adaptor sleeve 144. Allowing the housing 120 to cool can include passively allowing the housing 120 to cool and/or actively cooling the housing 120.

Alternatively, other implementations can form the interference fit by thermally contracting the adaptor sleeve (e.g., by actively cooling the adaptor sleeve), moving the adaptor sleeve and/or housing relative to one another so as to position the thermally contracted adaptor sleeve within the housing's opening, and then allowing the adaptor sleeve to thermally expand against the housing (e.g., by actively heating and/or passively allowing the adaptor sleeve to return to ambient temperate). In further implementations, the interference fit between the housing and the adaptor sleeve can be formed by using other suitable methods.

A wide range of materials can be used for the adaptor sleeve 144. In various implementations, the interference fit can be maintained across the machine's operating temperature range by appropriately sizing the sleeve 144 and/or by forming the adaptor sleeve 144 and housing 120 from suitable materials such that the housing 120 and adaptor sleeve 144 have coefficients of thermal expansion for maintaining the interference fit across the machine's operating temperature range. This, in turn, allows the adaptor sleeve 144 to remain engaged with the housing 120 independent of mechanical fasteners. For example, in one embodiment, the adaptor sleeve 144 can have a coefficient of thermal expansion that is lower than the housing 120 but the sleeve 144 can be sized such that the interference fit is nevertheless maintained across the machine's operating temperature range. The material selection for the housing 120 and sleeve 144 can also depend at least in part on thermal conductivity properties. In a preferred embodiment, the adaptor sleeve 144 is formed of steel, although other suitable materials can also be used.

In preferred implementations, the rotor assembly 100 also includes a second bearing 156 coupled to the shaft 108. In the illustrated embodiment of FIGS. 1 through 4, the second bearing 156 is on the shaft 108 adjacent the side 160 of the rotor core 104 opposite the impeller 112. The distance separating the first and second bearings 132 and 156 can help to spread out the loads between the two bearings 132 and 156, thereby allowing smaller bearings having higher limiting speeds to be used. Supporting the loads at each end with the spaced-apart bearings 132 and 152 can also yield a stiffer assembly with increased critical speeds as compared to a bearing system with an overhung load (e.g., load supported at only one end). But if the bearings are spaced too widely apart, the stiffness of the assembly can instead be decreased. Therefore, the preferred distance separating the bearings 132 and 156 can vary and will depend on the particular application. In various implementations, the centers of the bearing 132 and 156 are separated from one another by a distance of about two inches, although other distances can also be employed. By spacing out the bearings 132 and 156, various implementations enable bearings having steel rolling elements to be used in electric machines operable at high speeds and elevated temperatures.

Figure 7:
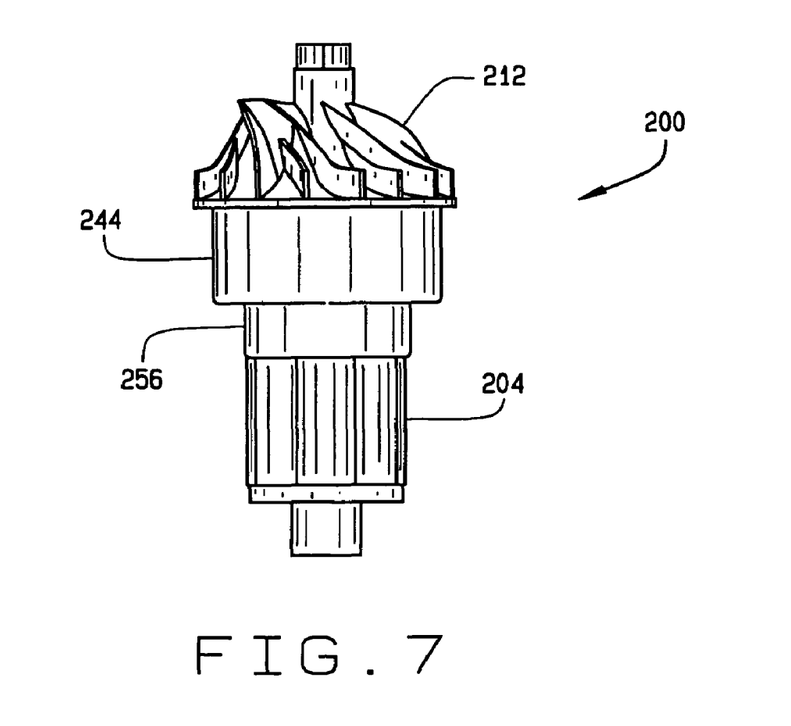
FIG. 7 is a perspective view of a rotor assembly according to another exemplary embodiment of the invention.

Alternative implementations, however, can include a second bearing positioned adjacent the first bearing. For example, FIG. 7 illustrates a rotor assembly 200 in which a first bearing (not shown but positioned within a sleeve 244) and a second bearing 256 are positioned adjacent one another on a shaft generally between a rotor core 204 and impeller 212. Still yet other implementations may not even include a second bearing.

With further reference to FIGS. 1 and 2, the second bearing 156 can include steel rolling elements. In one exemplary embodiment, the second bearing 156 is a standard 608-size ball bearing having steel balls. In another embodiment, however, the second bearing 156 is a roller bearing having generally cylindrical steel rollers. The second bearing 156 can be identical to the first bearing 132, although such is not required in all applications.

The second bearing 156 can be sized such that its outer race 168 fits within a central opening in an end shield (not shown), thereby allowing the shaft 108 to rotate relative to the end shield. When positioned within the end shield's opening, the second bearing 156 can contact a spring (e.g., multiwave compression spring, conventional round wire spring, etc.) also positioned within the end shield's opening. In this exemplary manner, the second bearing 156 can help maintain concentricity, support and balance the various components of the rotor assembly 100.

The use of a multiwave compression spring is generally preferred over a conventional round wire spring because multiwave springs generally occupy far less compressed height space than traditional round wire springs, while also providing more deflection with the same load specifications.

A balancing disk 172 can be positioned generally between the rotor core 104 and the second bearing 156. The balancing disk 172 provides a mass from which material can be removed for dynamic two-plane balancing of the rotor assembly 100.

Angular position of the rotor core 104 relative to the stator can be determined by sensing variation in the magnetic field of the sensor magnet 176, which is coupled to the shaft 108. These magnetic field changes, such as shifts in the polarity, can be quantified by a sensor (not shown) located at a fixed position relative to the stator but external to the rotor assembly 100. In further implementations, the angular position of the rotor core 104 can be determined using other suitable methods, such as optic sensors and/or sensorless electronic controls.

The sensor magnet 176 can be supported on the shaft 108 by a sensor magnet cup 180. In turn, the sensor magnet cup 180 can be retained on the shaft 108 by way of an interference or friction fit with the shaft 108. Alternatively, other means can be used to retain the sensor magnet cup 180 on the shaft 108, such as adhesives, mechanical fasteners, threads, etc.

A description will now be provided of an exemplary method by which the rotor assembly 100 can be constructed. FIGS. 3A through 3G illustrate various stages of the rotor assembly's construction, which can be performed manually, via automation, or a combination thereof.

Figure 3A:
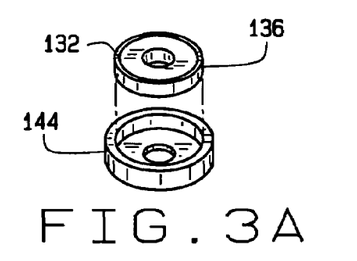
FIGS. 3A through 3G illustrate various stages of the rotor assembly shown in FIG. 1 as it is being assembled according to an exemplary implementation of the invention.
Figure 3B:
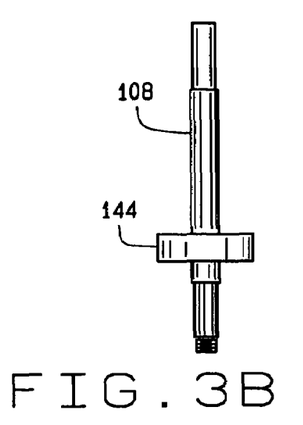
Figure 3C:
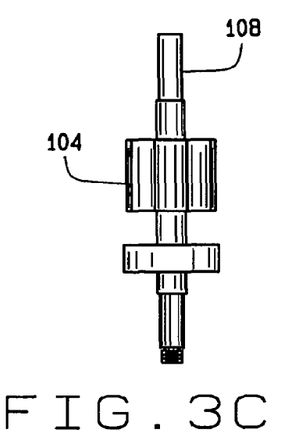
Figure 3D:
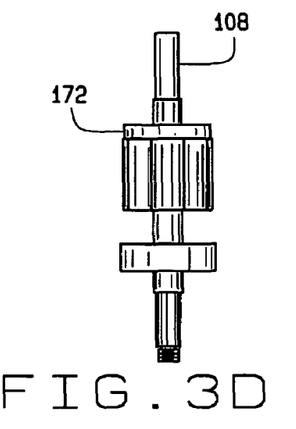
Figure 3E:
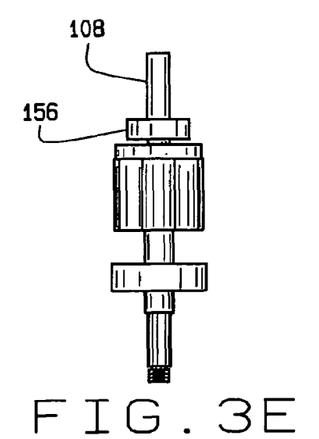
Figure 3F:
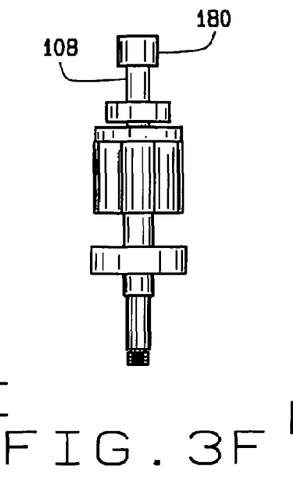
Figure 3G:
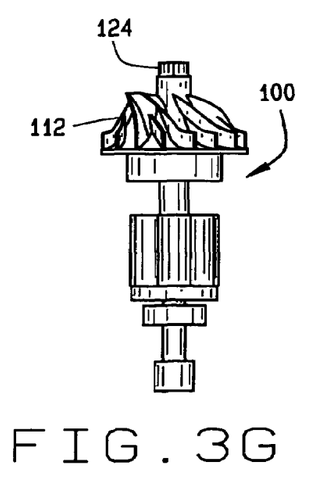

As shown in FIG. 3A, the adaptor sleeve 144 is positioned generally around the outer race 136 of the bearing 132, for example, by press fitting the bearing 132 into the adaptor sleeve 144. The shaft 108 is then slidably received (e.g., pressed) through the central openings (FIG. 3A) of the bearing 132 and sleeve 144 (FIG. 3B). Next, the rotor core 104 is slidably received on (e.g., pressed onto) the shaft 108 (FIG. 3C). The balancing disk 172 is slidably received on (e.g., pressed onto) the shaft 108 against the rotor core 104 (FIG. 3D). The second bearing 156 is slidably received on (e.g., pressed onto) the shaft 108 (FIG. 3E). The sensor magnet cup 180 is slidably received on (e.g., pressed onto) the shaft 108 (FIG. 3F). The sensor magnet 176 (not shown in FIG. 3F, but shown in FIG. 2) is aligned to the rotor's magnetic poles and positioned within the sensor magnet cup 180. The subassembly is inverted, and the impeller 112 and lock nut 124 are added (FIG. 3G). The rotor assembly 100 is now ready to be balanced. Balancing the rotor assembly 100 can include material removal from the balancing disk 172, material removal from the underside of the impeller 112, combinations thereof, etc.

In another form, the present invention provides methods of securing a bearing within an opening defined by a housing of an electric machine when the opening is larger than an outer race of the bearing. In one implementation, the method generally includes positioning an adaptor sleeve generally around the bearing's outer race, and forming an interference fit between the housing and the adaptor sleeve. The interference fit secures the adaptor sleeve and the bearing within the opening defined by the housing.

In yet another form, the present invention provides methods enabling one or more bearings having steel rolling elements to be used in an electric machine operable at high speeds and elevated temperatures. In one implementation, the method generally includes balancing a rotor assembly. The rotor assembly preferably includes at least two bearings having steel rolling elements (e.g., steel balls, generally cylindrical steel rollers, etc.) and that are spaced apart from one another on the shaft of the rotor assembly. The distance separating the bearings helps to spread out the loads between the two bearings, thereby allowing smaller bearings having higher limiting speeds to be used. Supporting the loads at each end with the spaced-apart bearings can also yield a stiffer assembly with increased critical speeds as compared to a bearing system with an overhung load (e.g., load supported at only one end). But if the bearings are spaced too widely apart, the stiffness of the assembly can decrease. Therefore, the preferred distance separating the bearings can vary and will depend on the particular application. In various implementations, the centers of the bearing are separated from one another by a distance of about two inches, although other distances can also be employed.

After balancing the rotor assembly, the balanced rotor assembly is coupled to a machine housing. Balancing the entire rotor assembly before its installation to the machine housing allows for a very well-balanced rotor assembly. This, in turn, can help minimize (or at least reduce) dynamic loading on the rotor assembly.

Various aspects of the present invention can be used in a wide range of electric machines, electric motors, electric superchargers, switched reluctance motors, brushless permanent magnet (BPM) motors, induction motors, and electric generators. Accordingly, the specific references to electric machine herein should not be construed as limiting the scope of the present invention to only one specific form/type of electric machine.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of securing a bearing within an opening defined by a housing of an electric machine when the opening is larger than an outer race of the bearing, the method comprising positioning an adaptor sleeve generally around the outer race, and forming an interference fit between the housing and the adaptor sleeve, the interference fit securing the adaptor sleeve and the bearing within the opening defined by the housing, the electric machine including an impeller and the opening being smaller than an outer diameter of the impeller.

2. The method of claim 1, wherein the bearing includes a plurality of steel balls.

3. The method of claim 1, wherein the bearing includes a plurality of generally cylindrical steel rollers.

4. The method of claim 1, wherein positioning the adaptor sleeve includes press fitting the bearing into the adaptor sleeve.

5. The method of claim 1, wherein forming the interference fit includes heating the housing to thermally expand the housing, positioning the adaptor sleeve within the opening, and allowing the housing to cool and thermally contract against the adaptor sleeve.

6. The method of claim 1, wherein the bearing is a 608 bearing.

7. The method of claim 1, further comprising coupling a bearing to a rotatable shaft generally between a rotor core and the impeller.

8. The method of claim 7, further comprising inserting the rotor core through the opening defined by the housing before forming the interference fit.

9. The method of claim 1, wherein the bearing and the adaptor sleeve comprise a portion of a rotor assembly.

10. The method of claim 9, further comprising balancing the rotor assembly before forming the interference fit.

11. In a method of securing a first bearing within an opening defined by a housing of an electric machine, the first bearing having an outer race with a first diameter, the opening having a size substantially equal to the first diameter, the improvement comprising selecting a second bearing instead of the first bearing, the second bearing having an outer race with a second diameter smaller than the first diameter, positioning an adaptor sleeve generally around the outer race of the second bearing, the adaptor sleeve having an outer diameter substantially equal to the first diameter, and forming an interference fit between the housing and the adaptor sleeve, the interference fit securing the adaptor sleeve and the second bearing within the opening defined by the housing.

* * * * *